US012119162B2

(12) United States Patent
Oishi

(10) Patent No.: US 12,119,162 B2
(45) Date of Patent: Oct. 15, 2024

(54) COIL COMPONENT

(71) Applicant: Murata Manufacturing Co., Ltd., Kyoto-fu (JP)

(72) Inventor: Masayuki Oishi, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 776 days.

(21) Appl. No.: 17/184,130

(22) Filed: Feb. 24, 2021

(65) Prior Publication Data

US 2021/0265100 A1 Aug. 26, 2021

(30) Foreign Application Priority Data

Feb. 25, 2020 (JP) ................................ 2020-029586

(51) Int. Cl.

| | |
|---|---|
| ***H01F 17/00*** | (2006.01) |
| ***H01F 3/14*** | (2006.01) |
| ***H01F 27/28*** | (2006.01) |
| ***H01F 27/29*** | (2006.01) |

(52) U.S. Cl.

CPC ........... *H01F 27/2823* (2013.01); *H01F 3/14* (2013.01); *H01F 17/0013* (2013.01); *H01F 27/292* (2013.01); *H01F 2017/0066* (2013.01)

(58) Field of Classification Search

CPC .... H01F 27/2823; H01F 3/14; H01F 17/0013; H01F 27/292; H01F 2017/0066

USPC .......................................................... 336/200

See application file for complete search history.

(56) References Cited

U.S. PATENT DOCUMENTS

| | | | | |
|---|---|---|---|---|
| 6,504,466 | B1 * | 1/2003 | Katsurada | H01F 17/0013 336/200 |
| 2012/0326827 | A1 * | 12/2012 | Nanjyo | H01F 17/0033 336/200 |
| 2017/0372824 | A1 * | 12/2017 | Wang | H01F 6/06 |
| 2018/0019052 | A1 * | 1/2018 | Hashimoto | H01F 41/046 |
| 2019/0172627 | A1 * | 6/2019 | Oishi | H01F 17/0013 |

FOREIGN PATENT DOCUMENTS

| | | | | |
|---|---|---|---|---|
| CN | 104681231 | A | | 6/2015 |
| CN | 107622861 | A | | 1/2018 |
| JP | H11-219821 | A | | 8/1999 |
| JP | 2004288942 | A | * | 10/2004 |
| JP | 2012129364 | A | * | 7/2012 |
| JP | 2012129367 | A | * | 7/2012 |

(Continued)

*Primary Examiner* — Shawki S Ismail
*Assistant Examiner* — Joselito S. Baisa
(74) *Attorney, Agent, or Firm* — Studebaker & Brackett PC

(57) ABSTRACT

A coil component that can stabilize the position of a coil while relaxing the stress between coil wiring and a magnetic layer includes an element body and a coil in the element body. The element body has magnetic layers laminated in a first direction. The coil has pieces of coil wiring laminated in the first direction. The pieces extend along a plane orthogonal to the first direction. Each of the pieces of coil wiring has two faces on both sides in the first direction and two side faces on both sides in a direction orthogonal to the first direction, in a section orthogonal to an extending direction of each of the pieces. The two faces and one side face among the two side faces form a gap with the magnetic layer, and the other side face among the two side faces is in contact with the magnetic layer.

15 Claims, 15 Drawing Sheets

(56) References Cited

FOREIGN PATENT DOCUMENTS

| | | | | |
|---|---|---|---|---|
| JP | 2018-011014 | A | 1/2018 | |
| WO | WO-2012008171 | A1 * | 1/2012 | ......... H01F 17/0033 |
| WO | 2015/156051 | A1 | 10/2015 | |

* cited by examiner

COIL COMPONENT

CROSS-REFERENCE TO RELATED APPLICATION

This application claims benefit of priority to Japanese Patent Application No. 2020-029586, filed Feb. 25, 2020, the entire content of which is incorporated herein by reference.

BACKGROUND

Technical Field

The present disclosure relates to a coil component.

Background Art

As a conventional coil component, there is one described in Japanese Patent Application Laid-Open No. H11-219821. This coil component includes a laminate and a coil provided in the laminate, the laminate has a plurality of laminated magnetic material layers, and the coil has a plurality of laminated conductor layers. Then, a gap is provided between the magnetic material layer and the conductor layer to prevent the magnetic material layer and the conductor layer from coming into contact with each other, thereby relaxing the stress between the magnetic material layer and the conductor layer.

SUMMARY

Incidentally, in the conventional coil component, because the gap is provided on the entire periphery of the conductor layer, the conductor layer is not in direct contact with the magnetic material layer, and there has been a possibility that the position of the conductor layer, that is, the position of the coil may not be stable.

Therefore, the present disclosure is to provide a coil component that can stabilize the position of a coil while relaxing the stress between a piece of coil wiring and a magnetic layer.

A coil component according to one aspect of the present disclosure includes an element body, and a coil provided in the element body. The element body has a plurality of magnetic layers laminated in a first direction. the coil has a plurality of pieces of coil wiring laminated in the first direction. The pieces of coil wiring extend along a plane orthogonal to the first direction. Each of the pieces of coil wiring have two faces on both sides in the first direction and two side faces on both sides in a direction orthogonal to the first direction, in a section orthogonal to an extending direction of each of the pieces of coil wiring. The two faces and one side face among the two side faces form a gap with the magnetic layer, and the other side face among the two side faces is in contact with the magnetic layer.

According to the above aspect, because the two faces and the one side face of the piece of coil wiring are provided with the gap with the magnetic layer, the stress between the piece of coil wiring and the magnetic layer can be relaxed. Further, because the other side face of the piece of coil wiring is in contact with the magnetic layer, the position of the piece of coil wiring, that is, the position of the coil becomes stable.

Preferably, in one embodiment of the coil component, the coil is spirally wound along the first direction, and the one side face of the piece of coil wiring is a side face of the coil on the inner magnetic path side.

According to the above embodiment, because the one side face of the piece of coil wiring is the side face of the coil on the inner magnetic path side, a gap is provided between the side face of the piece of coil wiring on the inner magnetic path side and the magnetic layer. As a result, the stress on a portion of the element body that becomes the inner magnetic path of the coil can be relaxed, and an impedance value and an inductance value can be secured. Further, because a gap is not provided between the side face of the piece of coil wiring on the outer magnetic path side and the magnetic layer, a distance can be secured between the gap and the surface of the element body, and occurrence of delamination can be suppressed in the magnetic layer at the time of manufacturing the coil component.

Preferably, in one embodiment of the coil component, the coil is spirally wound along the first direction, and the one side face of the piece of coil wiring is the side face of the coil on the outer magnetic path side.

According to the above embodiment, because one side face of the piece of coil wiring is the side face of the coil on the outer magnetic path side, a gap is provided between the side face of the piece of coil wiring on the outer magnetic path side and the magnetic layer. As a result, in the case of providing an external electrode on the surface of the element body, the stray capacitance generated between the external electrode and the piece of coil wiring can be reduced.

Further, because a gap is not provided between the side face of the piece of coil wiring on the inner magnetic path side and the magnetic layer, a sectional area of a portion of the element body that becomes the inner magnetic path of the coil can be increased. The magnetic flux generated from the coil tends to concentrate more in the inner magnetic path of the coil than in the outer magnetic path of the coil, and the impedance acquisition efficiency can be improved by enlarging the inner magnetic path of the coil.

Preferably, in one embodiment of the coil component, the two side faces of the piece of coil wiring are formed with irregularities.

According to the above embodiment, because the two side faces of the piece of coil wiring are formed with irregularities, and the other side face of the two side faces comes into contact with the magnetic layer, at the time of manufacturing the coil component (particularly during firing), the piece of coil wiring contracts in a direction in which the side face of the piece of coil wiring comes into contact with the magnetic layer. That is, because the piece of coil wiring contracts in a direction that is not obstructed by the meshing between the irregular side face of the piece of coil wiring and the magnetic layer, the shape of the piece of coil wiring and the gap becomes stable and the relaxation state of the stress can be stabilized.

Preferably, in one embodiment of the coil component, the piece of coil wiring has the aspect ratio of 0.3 or more and less than 1.0 (i.e., from 0.3 to less than 1.0) in a section orthogonal to the extending direction of the piece of coil wiring.

Here, the aspect ratio of the piece of coil wiring is (the thickness of the piece of coil wiring in the first direction)/(the maximum width of the piece of coil wiring in the direction orthogonal to the first direction), in the section of the piece of coil wiring.

According to the above embodiment, because the aspect ratio of the piece of coil wiring is 0.3 or more and less than 1.0 (i.e., from 0.3 to less than 1.0), the thickness of the piece of coil wiring in the first direction is smaller than the maximum width of the piece of coil wiring in the direction orthogonal to the first direction. In this state, because the side face of the piece of coil wiring comes into contact with the magnetic layer, the contact area between the piece of coil wiring and the magnetic layer can be made smaller as compared with the case in which the face of the piece of coil wiring in the first direction comes into contact with the magnetic layer, and the stress can be more relaxed.

Preferably, in one embodiment of the coil component, the piece of coil wiring has the aspect ratio of 1.0 or more in a section orthogonal to the extending direction of the piece of coil wiring.

Here, the aspect ratio of the piece of coil wiring is (the thickness of the piece of coil wiring in the first direction)/(the maximum width of the piece of coil wiring in the direction orthogonal to the first direction).

According to the above embodiment, because the aspect ratio of the piece of coil wiring is 1.0 or more, the thickness of the piece of coil wiring in the first direction becomes equal to or more than the maximum width of the piece of coil wiring in the direction orthogonal to the first direction. As a result, a direct current (DC) resistance Rdc of the piece of coil wiring can be reduced.

According to the coil component being one aspect of the present disclosure, the position of the coil can be stabilized while relaxing the stress between the piece of coil wiring and the magnetic layer.

DETAILED DESCRIPTION

Hereinafter, a coil component, which is one aspect of the present disclosure, is described in detail with reference to the illustrated embodiments. It should be noted that the drawings include some schematic ones and may not reflect the actual dimensions and ratios.

Figure 1:
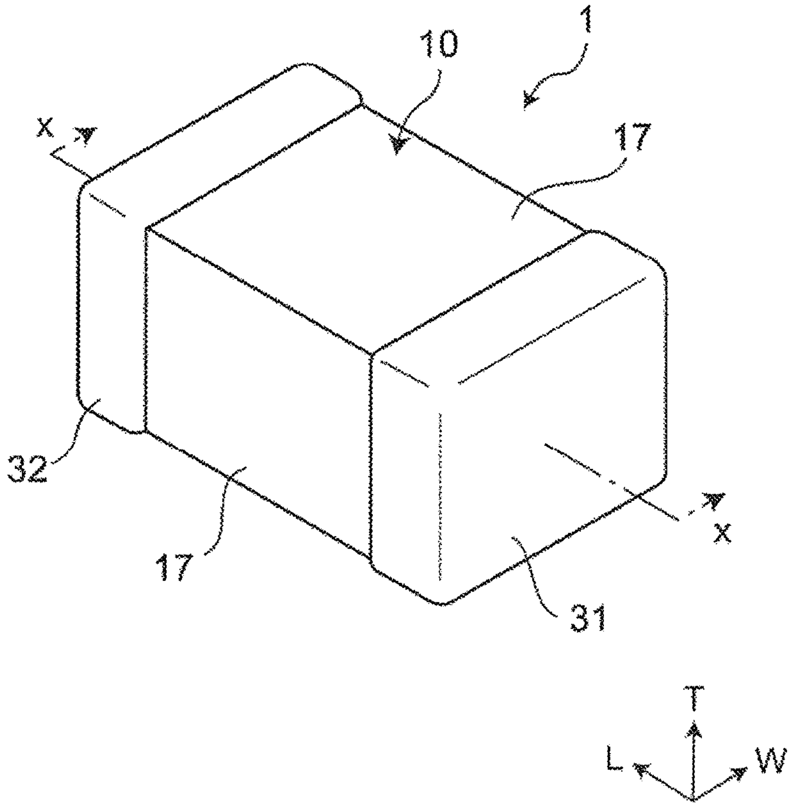
FIG. 1 is a perspective view showing a first embodiment of a coil component.
Figure 2:
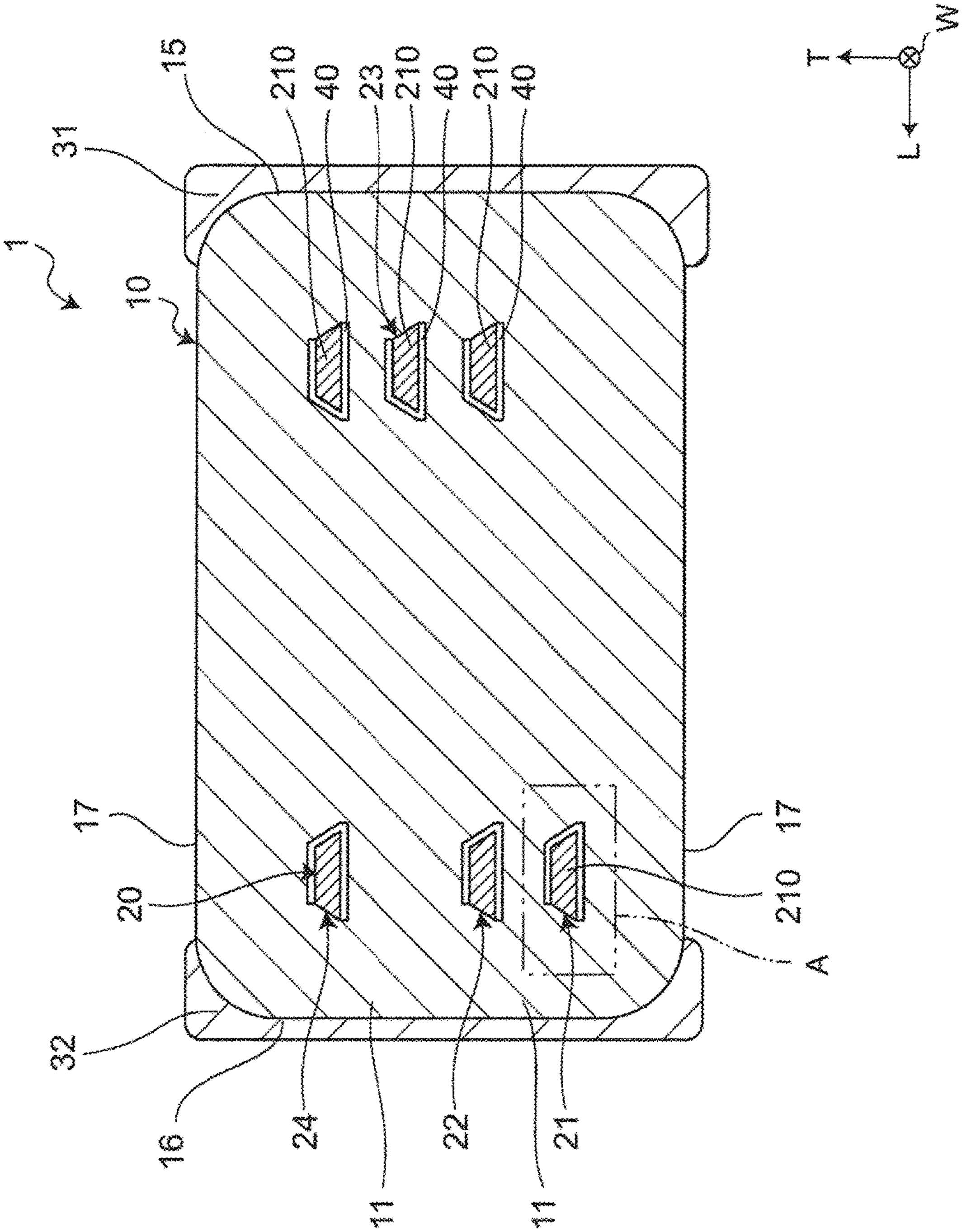
FIG. 2 is a sectional view taken along a line X-X of FIG. 1.
Figure 3:
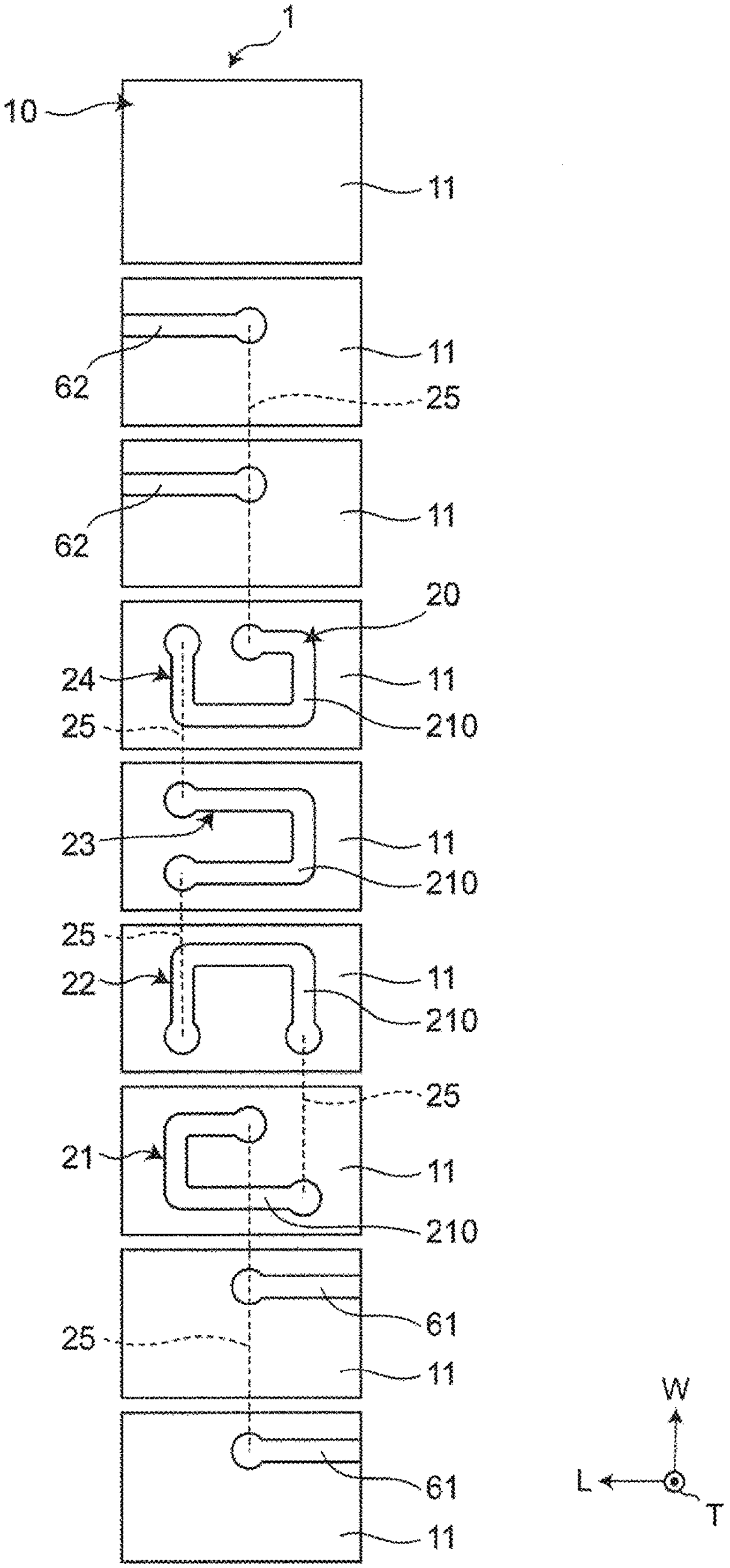
FIG. 3 is an exploded plan view of the coil component.

FIG. 1 is a perspective view showing a first embodiment of the coil component. FIG. 2 is a sectional view taken along a line X-X of FIG. 1 and is a sectional view of an L-T plane passing through the center in a W direction. FIG. 3 is an exploded plan view of the coil component, and shows a view along a T direction from the lower part to the upper part of the drawing. Note that the L direction is the length direction of the coil component 1, the W direction is the width direction of the coil component 1, and the T direction is the height direction (first direction) of the coil component 1. Hereinafter, the forward direction in the T direction is referred to as an upper side, and the reverse direction in the T direction is referred to as a lower side.

As shown in FIGS. 1, 2 and 3, the coil component 1 includes an element body 10, a coil 20 provided inside the element body 10, and a first external electrode 31 and a second external electrode 32 which are provided on a surface of the element body 10 and electrically connected to the coil 20.

The coil component 1 is electrically connected to wiring of a not-shown circuit board via the first and second external electrodes 31 and 32. The coil component 1 is used as, for example, a noise reduction filter, and is used in electronic devices such as personal computers, DVD players, digital cameras, televisions, mobile phones, and car electronics.

The element body 10 is formed in a substantially rectangular parallelepiped shape. The surface of the element body 10 has a first end face 15, a second end face 16 located on the opposite side of the first end face 15, and four side faces 17 located between the first end face 15 and the second end face 16. The first end face 15 and the second end face 16 face each other in the L direction.

The element body 10 includes a plurality of magnetic layers 11. The plurality of magnetic layers 11 are alternately laminated in the T direction. The magnetic layer 11 is made of magnetic material such as nickel-copper-zinc (Ni—Cu—Zn)-based ferrite material. The thickness of the magnetic layer 11 is, for example, 5 μm or more and 30 μm or less (i.e., from 5 μm to 30 μm). The element body 10 may partially include a non-magnetic layer.

The first external electrode 31 covers the entire face of the first end face 15 of the element body 10 and ends of the side faces 17 of the element body 10 on the first end face 15 side. The second external electrode 32 covers the entire face of the second end face 16 of the element body 10 and ends of the side faces 17 of the element body 10 on the second end face 16 side. The first external electrode 31 is electrically connected to a first end of the coil 20, and the second external electrode 32 is electrically connected to a second end of the coil 20. The first external electrode 31 may have an L-shape formed over the first end face 15 and one of the side faces 17, and the second external electrode 32 may have an L-shape formed over the second end face 16 and one of the side faces 17.

The coil 20 is spirally wound along the T direction. The coil 20 is made of conductive material such as silver (Ag) or Cu. The coil 20 has a plurality of pieces of coil wiring 21, 22, 23, and 24, and a plurality of extended conductor layers 61 and 62.

Two layers of the first extended conductor layers 61, the plurality of pieces of coil wiring 21, 22, 23, and 24, and two layers of the second extended conductor layers 62 are arranged in order in the T direction and are electrically connected in order via a connection 25. The connection 25 is provided so as to penetrate the magnetic layer 11 in the laminating direction.

Specifically, the pieces of first coil wiring 21, second coil wiring 22, third coil wiring 23, and fourth coil wiring 24 are connected in order in the T direction to form a spiral along the T direction. The plurality of pieces of coil wiring 21, 22, 23, and 24 each extends along a plane orthogonal to the T direction. The plurality of pieces of coil wiring 21, 22, 23, and 24 are each formed in a shape wound less than one turn. The first extended conductor layer 61 is exposed from the first end face 15 of the element body 10 and connected to the first external electrode 31, and the second extended conductor layer 62 is exposed from the second end face 16 of the element body 10 and connected to the second external electrode 32.

Each of the plurality of pieces of coil wiring 21, 22, 23, and 24 is constituted of one coil conductor layer 210. The thickness of the coil conductor layer 210 is, for example, 10 μm or more and 40 μm or less (i.e., from 10 μm to 40 μm). The coil conductor layer 210 is formed by, for example, printing a conductive paste and drying the paste.

Figure 4:
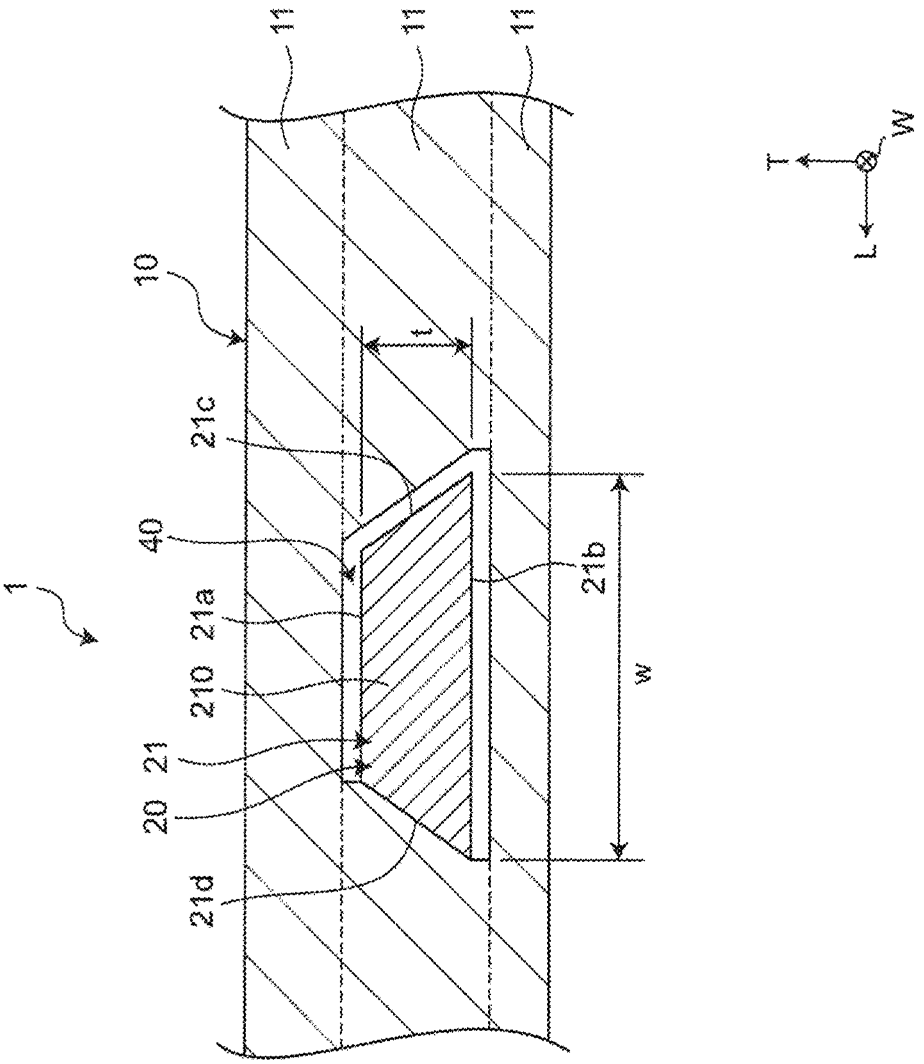
FIG. 4 is an enlarged sectional view of a part A of FIG. 2.

FIG. 4 is an enlarged sectional view of a part A in FIG. 2. That is, FIG. 4 shows a section orthogonal to the extending direction of the piece of first coil wiring 21.

As shown in FIG. 4, in the section orthogonal to the extending direction of the piece of first coil wiring 21, the piece of first coil wiring 21 has two faces 21*a* and 21*b* on both sides in the T direction, and two side faces 21*c* and 21*d* on both sides in a direction (width direction) orthogonal to the T direction. Specifically, the piece of first coil wiring 21 has an upper face 21*a* on the upper side in the T direction, a lower face 21*b* on the lower side in the T direction, an inner side face 21*c* on the inner magnetic path side of the coil 20 (the central axis side of the coil 20) in the width direction, and an outer side face 21*d* on the outer magnetic path side of the coil 20 (the side gap side of the element body 10) in the width direction. The upper face 21*a* is shorter than the lower face 21*b*, and a sectional shape of the piece of first coil wiring 21 (coil conductor layer 210) is trapezoidal.

The pieces of second coil wiring 22, third coil wiring 23, and fourth coil wiring 24 have the same configuration as the piece of first coil wiring 21, and the descriptions thereof are omitted.

The upper face 21*a*, the lower face 21*b*, and the inner side face 21*c* are provided with a gap 40 with the magnetic layer 11. The outer side face 21*d* comes into contact with the magnetic layer 11. The gap 40 is continuously formed along the upper face 21*a*, the lower face 21*b*, and the inner side face 21*c*. The maximum thickness of the gap 40 is, for example, 0.5 μm or more and 8.0 μm or less (i.e., from 0.5 μm to 8.0 μm).

According to this, because the upper face 21*a*, the lower face 21*b*, and the inner side face 21*c* are provided with the gap 40 with the magnetic layer 11, the stress between the piece of first coil wiring 21 and the magnetic layer 11 can be relaxed.

Further, because the outer side face 21*d* is in contact with the magnetic layer 11, the position of the piece of first coil wiring 21, that is, the position of the coil 20 becomes stable.

Further, because the piece of first coil wiring 21 is in contact with the magnetic layer 11 at the outer side face 21*d*, the residual stress is smaller than in the case in which the piece of coil wiring is in contact with the magnetic layer at the upper face or lower face, and the impedance value and the inductance value can be secured.

Further, because the piece of first coil wiring 21 is not in contact with the magnetic layer 11 at the upper face 21*a*, the stress applied on the magnetic layer 11 located between the pieces of first coil wiring 21 and second coil wiring 22 adjacent to each other in the T direction can be relaxed. As a result, the thickness of the magnetic layer 11 between the adjacent pieces of wiring can be reduced, and the number of pieces of coil wiring can be increased and the number of turns of the coil 20 can be increased. Similarly, because the piece of second coil wiring 22 is not in contact with the magnetic layer 11 at the lower face 22*b*, the stress applied on the magnetic layer 11 located between the pieces of first coil wiring 21 and second coil wiring 22 adjacent to each other in the T direction can be more relaxed.

Further, because the gap 40 is provided between the inner side face 21*c* of the piece of first coil wiring 21 and the magnetic layer 11, the stress applied to a portion of the element body 10 that becomes the inner magnetic path of the coil 20 is relaxed, and the impedance value and the inductance value can be secured. Further, because the gap 40 is not provided between the outer side face 21*d* of the piece of first coil wiring 21 and the magnetic layer 11, the distance between the gap 40 and the surface of the element body 10, that is, the thickness at a portion that becomes the outer magnetic path the coil 20 in the element body 10 can be secured, and the occurrence of delamination can be suppressed in the magnetic layer 11 at the time of manufacturing the coil component 1.

In the section orthogonal to the extending direction of the piece of first coil wiring 21, the aspect ratio of the piece of first coil wiring 21 is preferably 0.3 or more and less than 1.0 (i.e., from 0.3 to less than 1.0). The aspect ratio of the piece of first coil wiring 21 is (the thickness t of the piece of first coil wiring 21 in the T direction)/(the maximum width w of the piece of first coil wiring 21 in the L direction orthogonal to the T direction), in the section of the piece of first coil wiring 21.

According to this, in the cross section of the piece of first coil wiring 21, the thickness t of the piece of first coil wiring 21 becomes smaller than the maximum width w of the piece of first coil wiring 21. In this state, the outer side face 21*d* of the piece of first coil wiring 21 comes into contact with the magnetic layer 11, therefore, the contact area between the piece of first coil wiring 21 and the magnetic layer 11 can be made smaller as compared with the case in which the upper face or lower face of the piece of coil wiring comes into contact with the magnetic layer, and the stress can be more relaxed.

Next, a method of manufacturing the coil component 1 is described with reference to FIGS. 5A to 5E. FIGS. 5A to 5E show sections orthogonal to the extending direction of the piece of first coil wiring 21.

Figure 5A:
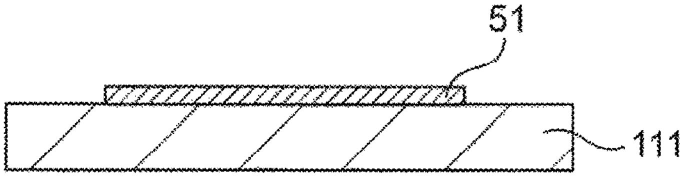
FIG. 5A is a sectional view illustrating an example of a method of manufacturing the coil component.

As shown in FIG. 5A, a first burn-out part 51 is laminated on a first magnetic paste layer 111. The first magnetic paste layer 111 is formed by, for example, printing a magnetic paste and drying the paste. The first magnetic paste layer 111 is a state of the magnetic layer 11 before being fired. The burn-out part is made of material that is burnt out by firing, for example, resin material.

Figure 5B:
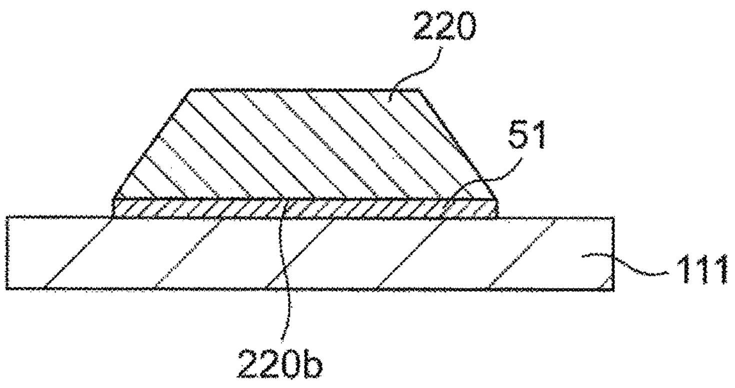
FIG. 5B is a sectional view illustrating an example of the method of manufacturing the coil component.

As shown in FIG. 5B, a coil conductor paste layer 220 is laminated on the first burn-out part 51. A lower face 220*b* of the coil conductor paste layer 220 comes into contact with the first burn-out part 51. The coil conductor paste layer 220 is formed, for example, by printing a conductive paste and drying the paste. The coil conductor paste layer 220 is a state of the coil conductor layer 210 before being fired. One layer of coil conductor paste layers 220 forms the piece of first coil wiring 21 before being fired.

Figure 5C:
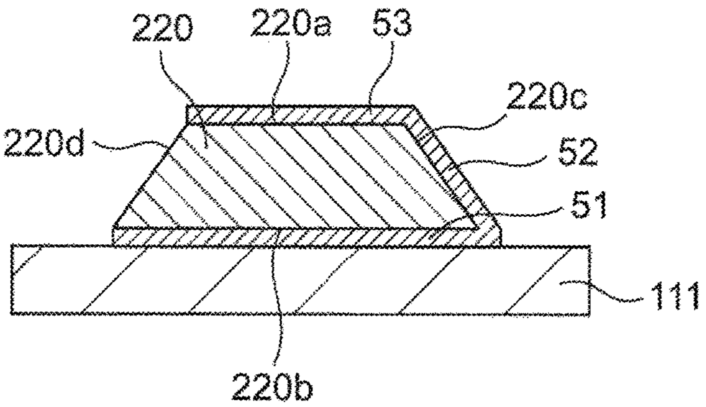
FIG. 5C is a sectional view illustrating an example of the method of manufacturing the coil component.

As shown in FIG. 5C, a second burn-out part 52 is provided on an inner side face 220*c* of the coil conductor paste layer 220, and a third burn-out part 53 is provided on the upper face 220*a* of the coil conductor paste layer 220. A burn-out part is not provided on an outer side face 220*d* of the coil conductor paste layer 220.

Figure 5D:
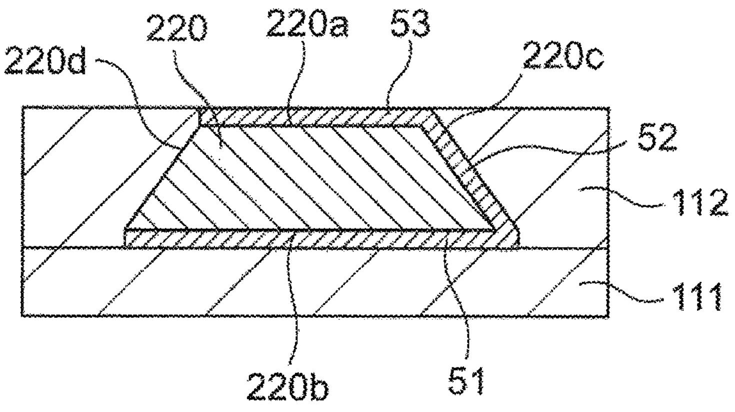
FIG. 5D is a sectional view illustrating an example of the method of manufacturing the coil component.

As shown in FIG. 5D, a second magnetic paste layer 112 is laminated on the first magnetic paste layer 111 so as to expose the third burn-out part 53 and cover the outer side face 220*d* of the coil conductor paste layer 220 and the second burn-out part 52. The outer side face 220*d* of the coil conductor paste layer 220 is in contact with the second magnetic paste layer 112.

Figure 5E:
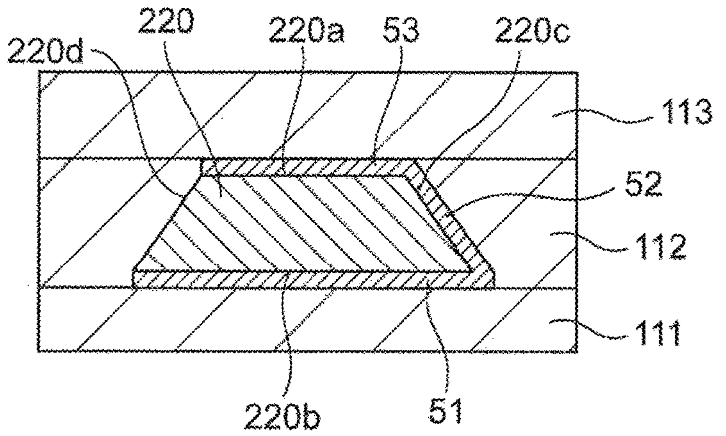
FIG. 5E is a sectional view illustrating an example of the method of manufacturing the coil component.

As shown in FIG. 5E, a third magnetic paste layer 113 is laminated on the second magnetic paste layer 112 so as to cover the third burn-out part 53. The above laminating steps are repeated a plurality of times to form the pieces of second coil wiring 22, third coil wiring 23, and fourth coil wiring 24 before being fired, and then the pieces of coil wiring are fired. As a result, the first to third burn-out parts 51 to 53 are burnt out to form the gap 40, and the coil component 1 shown in FIG. 2 is manufactured.

Second Embodiment

Figure 6:
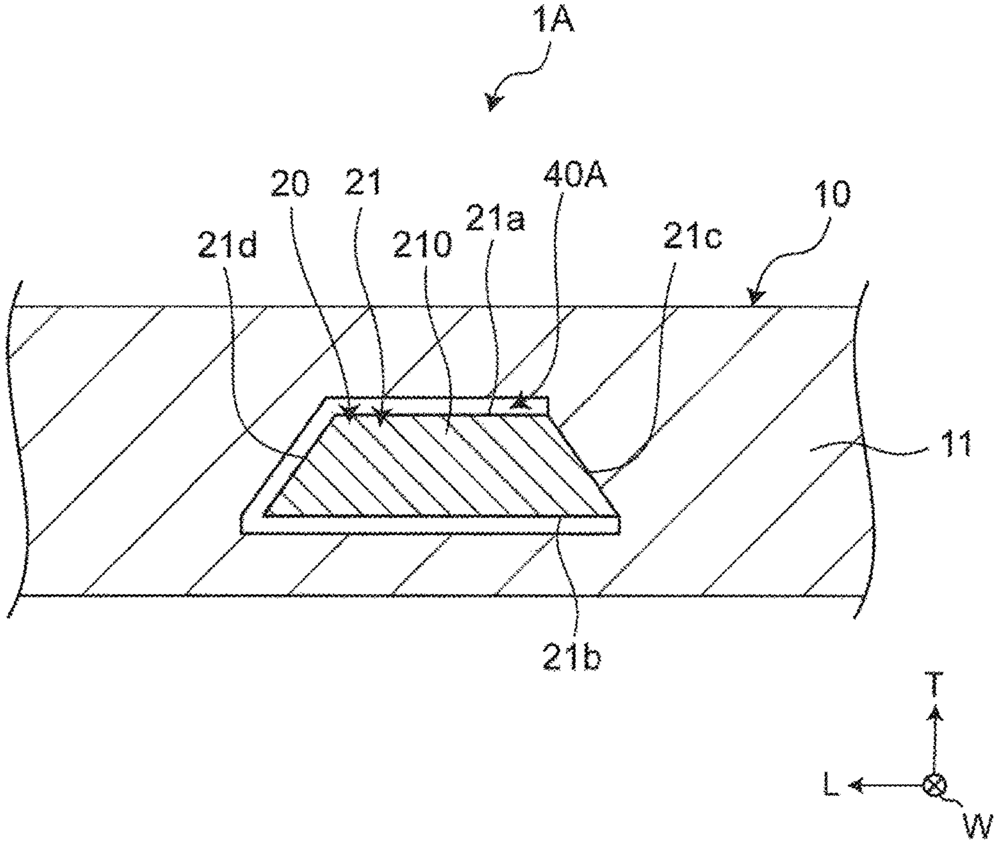
FIG. 6 is a sectional view showing a second embodiment of the coil component of the present disclosure.

FIG. 6 is a sectional view showing a second embodiment of the coil component of the present disclosure. The second embodiment is different from the first embodiment (FIG. 4) in the shape of the gap. A configuration of the above difference is described below. In the second embodiment, the constitutional elements having the same reference numerals as those in the first embodiment have the same configurations as those in the first embodiment, and thus the descriptions thereof are omitted.

As shown in FIG. 6, in a coil component 1A of the second embodiment, a gap 40A is continuously formed along an upper face 21*a*, a lower face 21*b*, and an outer side face 21*d* of a piece of first coil wiring 21. That is, the upper face 21*a*, the lower face 21*b*, and the outer side face 21*d* are provided with a gap 40A with a magnetic layer 11. An inner side face 21*c* comes into contact with the magnetic layer 11. The pieces of second coil wiring 22, third coil wiring 23, and fourth coil wiring 24 have the same configuration as the piece of first coil wiring 21, and the descriptions thereof are omitted.

According to the second embodiment, because the side face of the piece of first coil wiring 21 on the gap 40A side is the outer side face 21*d*, the gap 40A is provided between the outer side face 21*d* of the piece of first coil wiring 21 and the magnetic layer 11. As a result, in the case of external electrodes 31 and 32 are provided on the surface of an element body 10 (the face facing the outer side face 21*d*), the stray capacitance generated between the external electrodes 31 and 32 and the piece of first coil wiring 21 can be reduced.

Further, because the gap 40A is not provided between the inner side face 21*c* of the piece of first coil wiring 21 and the magnetic layer 11, the sectional area of the portion of the element body 10 that becomes the inner magnetic path of a coil 20 can be increased. The magnetic flux generated from the coil 20 tends to concentrate more in the inner magnetic path of the coil 20 than in the outer magnetic path of the coil 20, and the impedance acquisition efficiency can be improved by enlarging the inner magnetic path of the coil 20.

Third Embodiment

Figure 7:
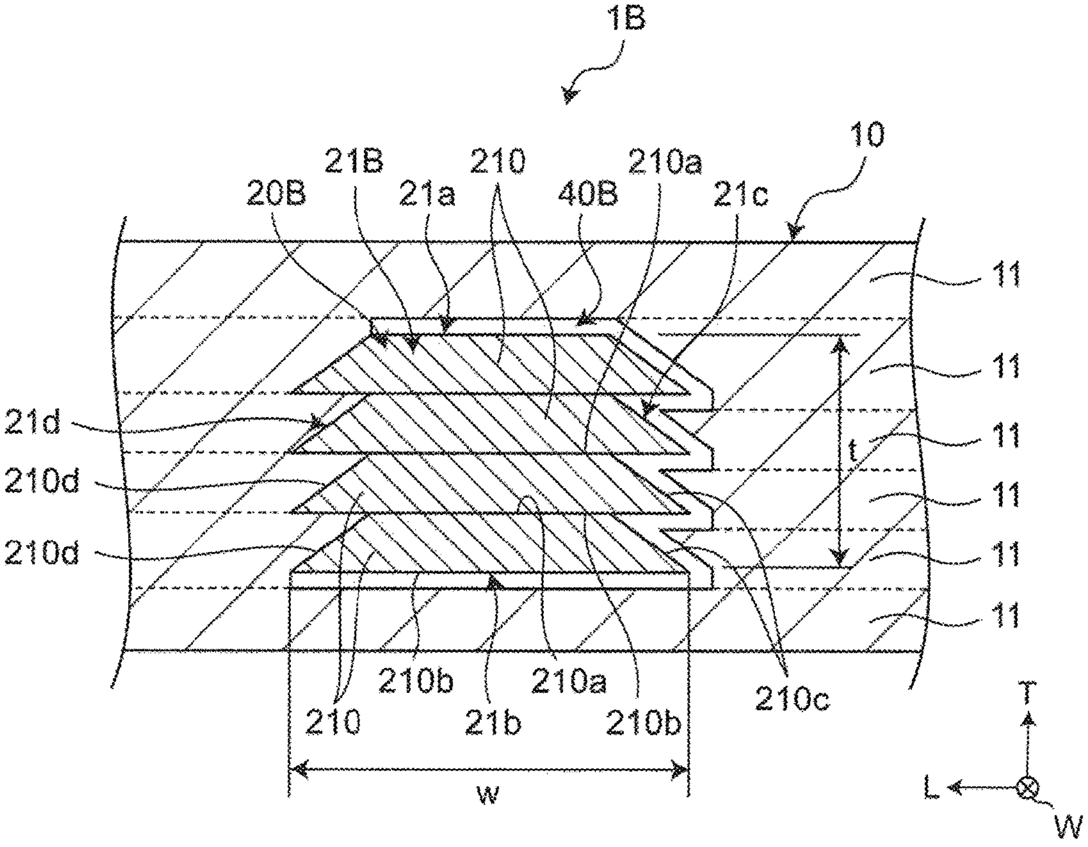
FIG. 7 is a sectional view showing a third embodiment of the coil component of the present disclosure.

FIG. 7 is a sectional view showing a third embodiment of the coil component of the present disclosure. The third embodiment is different from the first embodiment (FIG. 4) in the shape of the coil and the gap. A configuration of the above difference is described below. In the third embodiment, the constitutional elements having the same reference numerals as those in the first embodiment have the same configurations as those in the first embodiment, and thus the descriptions thereof are omitted.

As shown in FIG. 7, in a coil component 1B of the third embodiment, an inner side face 21*c* and an outer side face 21*d* of a piece of first coil wiring 21B of a coil 20B are formed with irregularities. An upper face 21*a*, a lower face 21*b*, and the inner side face 21*c* of the piece of first coil wiring 21B are provided with a gap 40B with a magnetic layer 11. The outer side face 21*d* of the piece of first coil wiring 21B comes into contact with the magnetic layer 11.

The gap 40B is continuously formed along the upper face 21*a*, the lower face 21*b*, and the inner side face 21*c*. Pieces of second coil wiring, third coil wiring, and fourth coil wiring have the same configuration as the piece of first coil wiring 21B, and the descriptions thereof are omitted.

The piece of first coil wiring 21B has a plurality of coil conductor layers 210 (four layers in this embodiment), the plurality of coil conductor layers 210 are laminated in the T direction, and the coil conductor layers 210 and 210 adjacent to each other in the T direction are in surface contact with each other. Specifically, in the coil conductor layers 210 and 210 adjacent to each other in the T direction, an upper face

210*a* of the lower coil conductor layer 210 is in surface contact with a lower face 210*b* of the upper coil conductor layer 210.

The upper face 21*a* of the piece of first coil wiring 21B is constituted of the upper face 210*a* of the uppermost coil conductor layer 210. The lower face 21*b* of the piece of first coil wiring 21B is constituted of the lower face 210*b* of the lowermost coil conductor layer 210. The inner side face 21*c* of the piece of first coil wiring 21B is constituted of inner side faces 210*c* of the plurality of coil conductor layers 210 and ends of the lower faces 210*b* of the plurality of coil conductor layers 210. The outer side face 21*d* of the piece of first coil wiring 21B is constituted of outer side faces 210*d* of the plurality of coil conductor layers 210 and ends of the lower faces 210*b* of the plurality of coil conductor layers 210.

A recess is formed between the coil conductor layers 210 and 210 adjacent to each other in the T direction. Specifically, in the coil conductor layers 210 and 210 adjacent to each other in the T direction, the recesses are provided between the inner side face 21*c* and the outer side face 21*d* of the lower coil conductor layer 210 and the ends of the lower face 210*b* of the upper coil conductor layer 210.

According to the third embodiment, because the inner side face 21*c* and the outer side face 21*d* of the piece of first coil wiring 21B are formed with irregularities, and the outer side face 21*d* of the piece of first coil wiring 21B comes into contact with the magnetic layer 11, at the time of manufacturing the coil component 1B (particularly during firing), the piece of first coil wiring 21B contracts in a direction in which the outer side face 21*d* of the piece of first coil wiring 21B and the magnetic layer 11 come into contact with each other. That is, because the first coil wiring 21B contracts in the direction (L direction) that is not obstructed by the meshing between the irregular inner side face 21*c* and outer side face 21*d* of the piece of first coil wiring 21B and the magnetic layer 11, the shapes of the piece of first coil wiring 21B and the gap 40B become stable and the relaxation state of the stress can be stabilized.

On the other hand, as a comparative example, in the case of the lower face of the first coil wiring coming into contact with the magnetic layer, the first coil wiring contracts in a direction (downward) in which the lower face of the first coil wiring comes into contact with the magnetic layer, at the time of manufacturing the coil component (particularly during firing). For this reason, there is a problem that a large stress is applied to the meshing portions between the irregular inner side face and outer side face of the first coil wiring and the magnetic layer. Specifically, a large stress is applied to the contact portions between both ends of the lower face of the coil conductor layer and the magnetic layer.

As shown in FIG. 7, the aspect ratio (t/w) of the piece of first coil wiring 21B is preferably 1.0 or more in the section orthogonal to the extending direction of the piece of first coil wiring 21B. According to this, the thickness t of the piece of first coil wiring 21B is equal to or more than the maximum width w of the piece of first coil wiring 21B. As a result, the DC resistance Rdc of the piece of first coil wiring 21B can be reduced.

Next, a method of manufacturing the coil component 1B is described with reference to FIGS. 8A to 8I. FIGS. 8A to 8I show sections orthogonal to the extending direction of the piece of first coil wiring 21B.

Figure 8A:
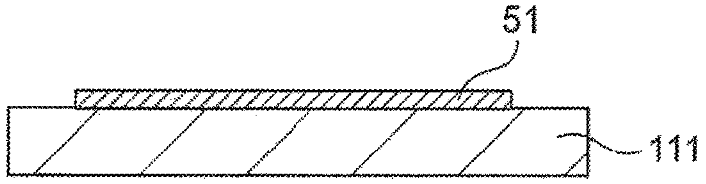
FIG. 8A is a sectional view illustrating an example of a method of manufacturing the coil component.

As shown in FIG. 8A, a first burn-out part 51 is laminated on a first magnetic paste layer 111. The first magnetic paste layer 111 is formed by, for example, printing a magnetic paste and drying the paste. The first magnetic paste layer 111 is a state of the magnetic layer 11 before being fired. The burn-out part is made of material that is burnt out by firing, for example, resin material.

Figure 8B:
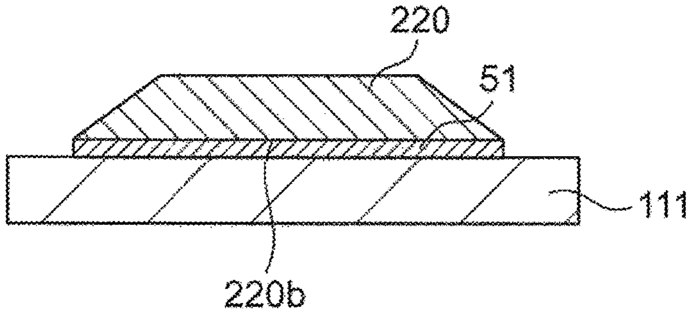
FIG. 8B is a sectional view illustrating an example of the method of manufacturing the coil component.

As shown in FIG. 8B, a first layer of coil conductor paste layers 220 is laminated on the first burn-out part 51. A lower face 220*b* of the first layer of coil conductor paste layers 220 comes into contact with the first burn-out part 51. The first layer of coil conductor paste layers 220 is formed, for example, by printing a conductive paste and drying the paste. The coil conductor paste layer 220 is a state of the coil conductor layer 210 before being fired.

Figure 8C:
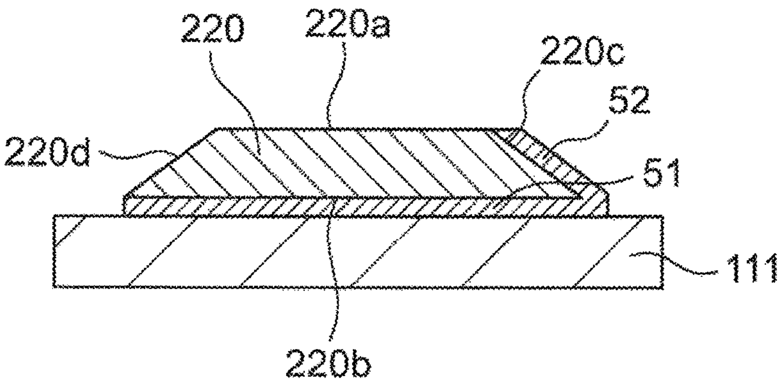
FIG. 8C is a sectional view illustrating an example of the method of manufacturing the coil component.

As shown in FIG. 8C, a second burn-out part 52 is provided on an inner side face 220*c* of the first layer of coil conductor paste layers 220. The burn-out part is not provided on an upper face 220*a* and an outer side face 220*d* of the first layer of coil conductor paste layers 220.

Figure 8D:
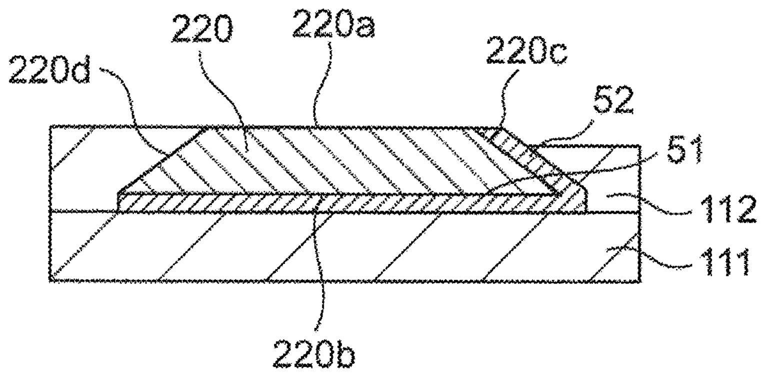
FIG. 8D is a sectional view illustrating an example of the method of manufacturing the coil component.

As shown in FIG. 8D, a second magnetic paste layer 112 is laminated on the first magnetic paste layer 111 so as to expose the upper face 220*a* of the first layer of coil conductor paste layers 220 and to cover the outer side face 220*d* of the first layer of coil conductor paste layers 220 and the second burn-out part 52. The outer side face 220*d* of the first layer of coil conductor paste layers 220 is in contact with the second magnetic paste layer 112.

Figure 8E:
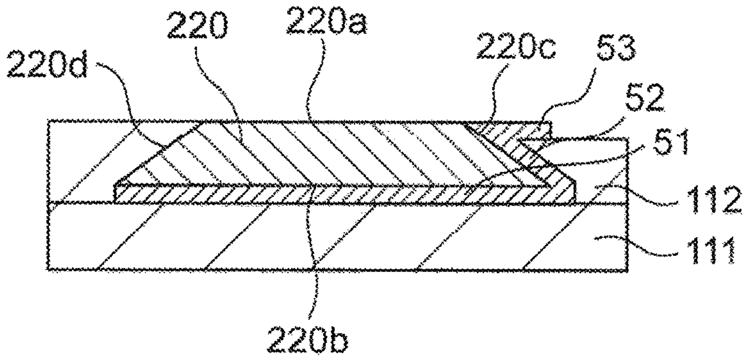
FIG. 8E is a sectional view illustrating an example of the method of manufacturing the coil component.

As shown in FIG. 8E, a third burn-out part 53 is provided on the second magnetic paste layer 112 so as to be connected to the second burn-out part 52.

Figure 8F:
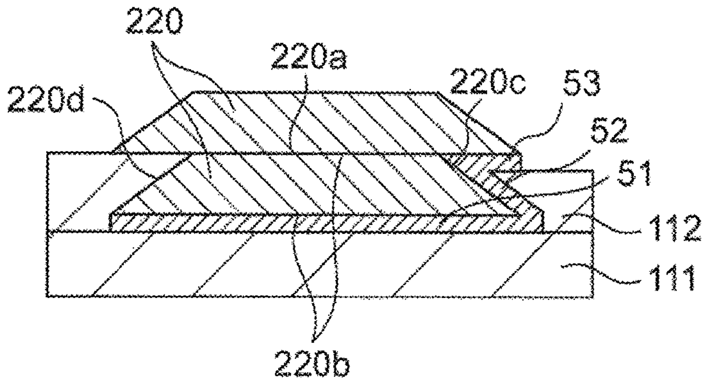
FIG. 8F is a sectional view illustrating an example of the method of manufacturing the coil component.

As shown in FIG. 8F, the second layer of coil conductor paste layers 220 is laminated on the first layer of coil conductor paste layers 220. At this time, the lower face 220*b* of the second layer of coil conductor paste layers 220 comes into contact with the upper face 220*a* of the first layer of coil conductor paste layers 220, the second magnetic paste layer 112, and the third burn-out part 53. That is, among the lower face 220*b* of the second layer of coil conductor paste layers 220, the end on the outer side face 220*d* side comes into contact with the second magnetic paste layer 112, and among the lower face 220*b* of the second layer of coil conductor paste layers 220, the end on the inner side face 220*c* side comes into contact with the third burn-out part 53.

Figure 8G:
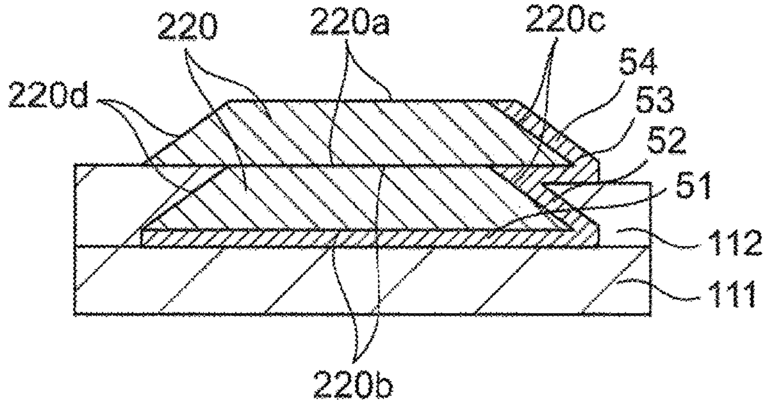
FIG. 8G is a sectional view illustrating an example of the method of manufacturing the coil component.

As shown in FIG. 8G, a fourth burn-out part 54 is provided on the inner side face 220*c* of the second layer of coil conductor paste layers 220. The burn-out part is not provided on the upper face 220*a* and the outer side face 220*d* of the second layer of coil conductor paste layers 220.

Figure 8H:
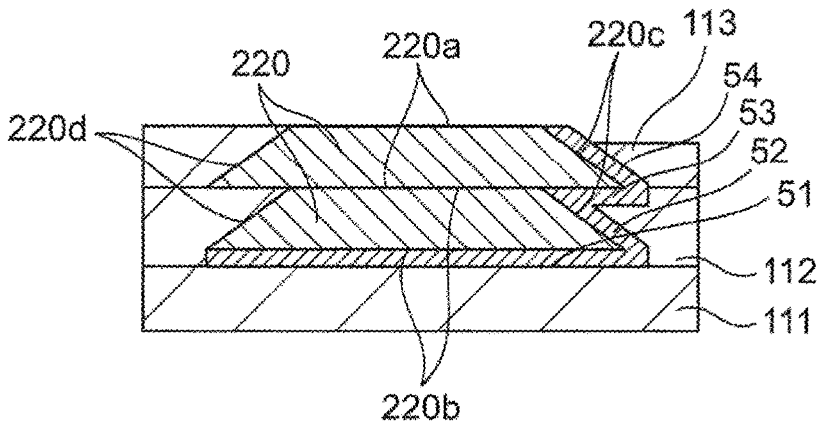
FIG. 8H is a sectional view illustrating an example of the method of manufacturing the coil component.

As shown in FIG. 8H, a third magnetic paste layer 113 is laminated on the second magnetic paste layer 112 so as to expose the upper face 220*a* of the second layer of coil conductor paste layers 220 and to cover the outer side face 220*d* of the second layer of coil conductor paste layers 220 and the fourth burn-out part 54. The outer side face 220*d* of the second layer of coil conductor paste layers 220 is in contact with the third magnetic paste layer 113.

Figure 8I:
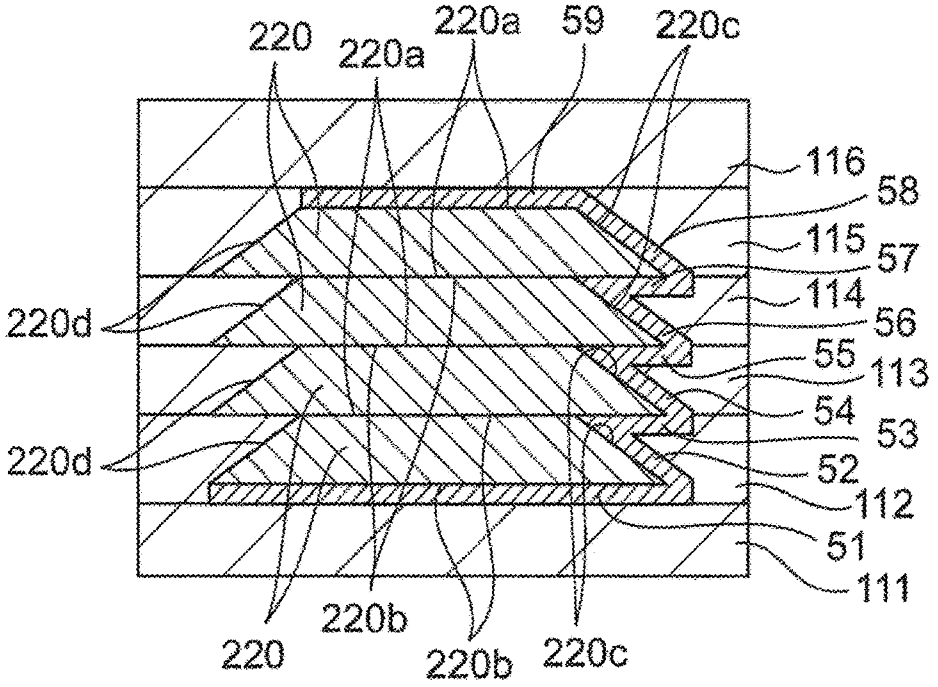
FIG. 8I is a sectional view illustrating an example of the method of manufacturing the coil component.

As shown in FIG. 8I, the above laminating steps are repeated, and the third layer of coil conductor paste layers 220, the fourth layer of coil conductor paste layers 220, a fourth magnetic paste layer 114, a fifth magnetic paste layer 115, and a sixth magnetic paste layer 116 are laminated.

At this time, among the lower face 220*b* of the third layer of coil conductor paste layers 220, the end on the outer side face 220*d* side comes into contact with the third magnetic paste layer 113. Among the lower face 220*b* of the third layer of coil conductor paste layers 220, the end on the inner side face 220*c* side comes into contact with a fifth burn-out part 55. The inner side face 220*c* of the third layer of coil conductor paste layers 220 comes into contact with a sixth burn-out part 56. The outer side face 220*d* of the third layer of coil conductor paste layers 220 comes into contact with the fourth magnetic paste layer 114.

Further, among the lower face 220*b* of the fourth layer of coil conductor paste layers 220, the end on the outer side face 220*d* side comes into contact with the fourth magnetic paste layer 114. Among the lower face 220*b* of the fourth layer of coil conductor paste layers 220, the end on the inner side face 220*c* side comes into contact with a seventh burn-out part 57. The inner side face 220*c* of the fourth layer of coil conductor paste layers 220 comes into contact with an eighth burn-out part 58. The upper face 220*a* of the fourth layer of coil conductor paste layers 220 comes into contact with a ninth burn-out part 59. The outer side face 220*d* of the fourth layer of coil conductor paste layers 220 comes into contact with the fifth magnetic paste layer 115.

As a result, the first to fourth layers of coil conductor paste layers 220 form the piece of first coil wiring 21B before being fired.

The above laminating steps are repeated a plurality of times to form the pieces of second coil wiring, third coil wiring, and fourth coil wiring before being fired, and then the pieces of coil wiring are fired. As a result, the first to ninth burn-out parts 51 to 59 are burnt out to form the gap 40B, and the coil component 1B shown in FIG. 7 is manufactured.

Fourth Embodiment

Figure 9:
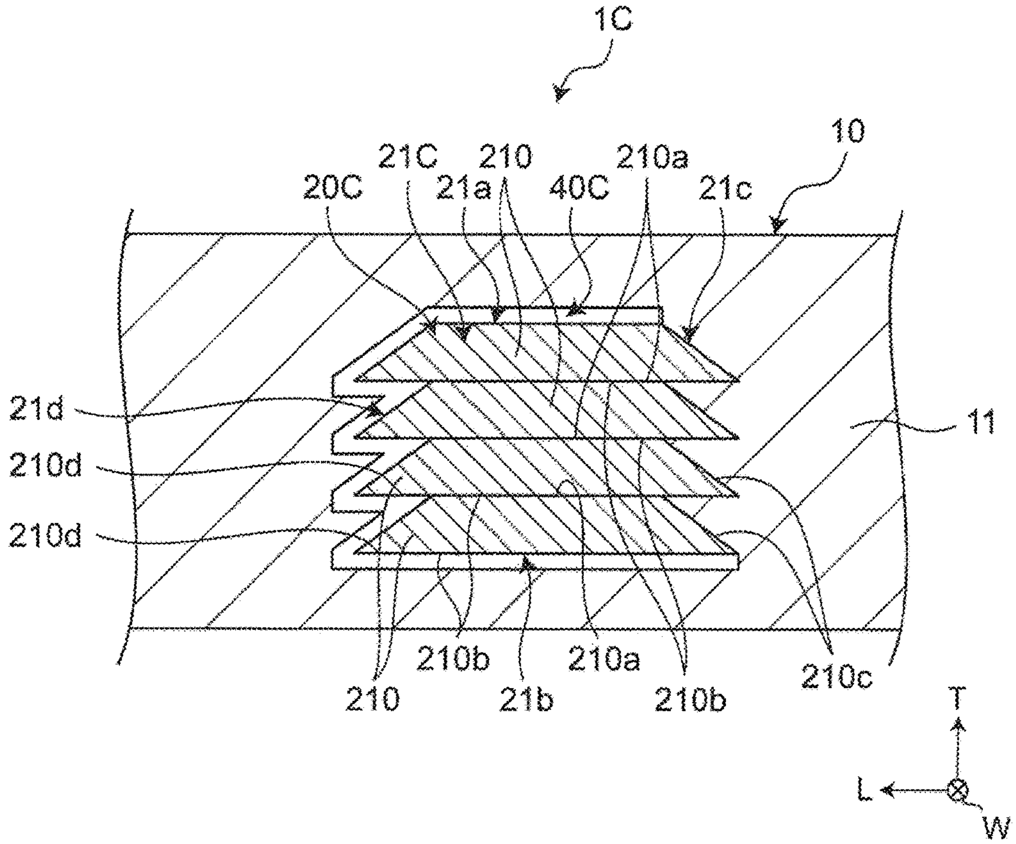
FIG. 9 is a sectional view showing a fourth embodiment of the coil component of the present disclosure.

FIG. 9 is a sectional view showing a fourth embodiment of the coil component of the present disclosure. The fourth embodiment is different from the third embodiment (FIG. 7) in the shape of the gap. A configuration of the above difference is described below. In the fourth embodiment, the constitutional elements having the same reference numerals as those in the third embodiment have the same configurations as those in the third embodiment, and thus the descriptions thereof are omitted.

As shown in FIG. 9, in a coil component 1C of the fourth embodiment, a gap 40C is continuously formed along an upper face 21*a*, a lower face 21*b*, and an outer side face 21*d* of a piece of first coil wiring 21C. That is, the upper face 21*a*, the lower face 21*b*, and the outer side face 21*d* are provided with the gap 40C with a magnetic layer 11. An inner side face 21*c* comes into contact with the magnetic layer 11. Pieces of second coil wiring, third coil wiring, and fourth coil wiring have the same configuration as the piece of first coil wiring 21C, and the descriptions thereof are omitted. A coil 20C (the pieces of first coil wiring 21C, second coil wiring, third coil wiring, and fourth coil wiring) has the same configuration as the coil 20B (the pieces of first coil wiring 21B, second coil wiring, third coil wiring, and fourth coil wiring) of the third embodiment.

According to the fourth embodiment, because the side face of the piece of first coil wiring 21C on the gap 40C side is the outer side face 21*d*, the gap 40C is provided between the outer side face 21*d* of the piece of first coil wiring 21C and the magnetic layer 11. As a result, in the case of providing external electrodes 31 and 32 on the surface (the face facing the outer side face 21*d*) of an element body 10, the stray capacitance generated between the external electrodes 31 and 32 and the piece of first coil wiring 21C can be reduced.

Further, because the gap 40C is not provided between the inner side face 21*c* of the piece of first coil wiring 21C and the magnetic layer 11, the sectional area of the portion of the element body 10 that becomes the inner magnetic path of the coil 20C can be increased. The magnetic flux generated from the coil 20C tends to concentrate more in the inner magnetic path of the coil 20C than in the outer magnetic path of the coil 20C, and the impedance acquisition efficiency can be improved by enlarging the inner magnetic path of the coil 20C.

Fifth Embodiment

Figure 10:
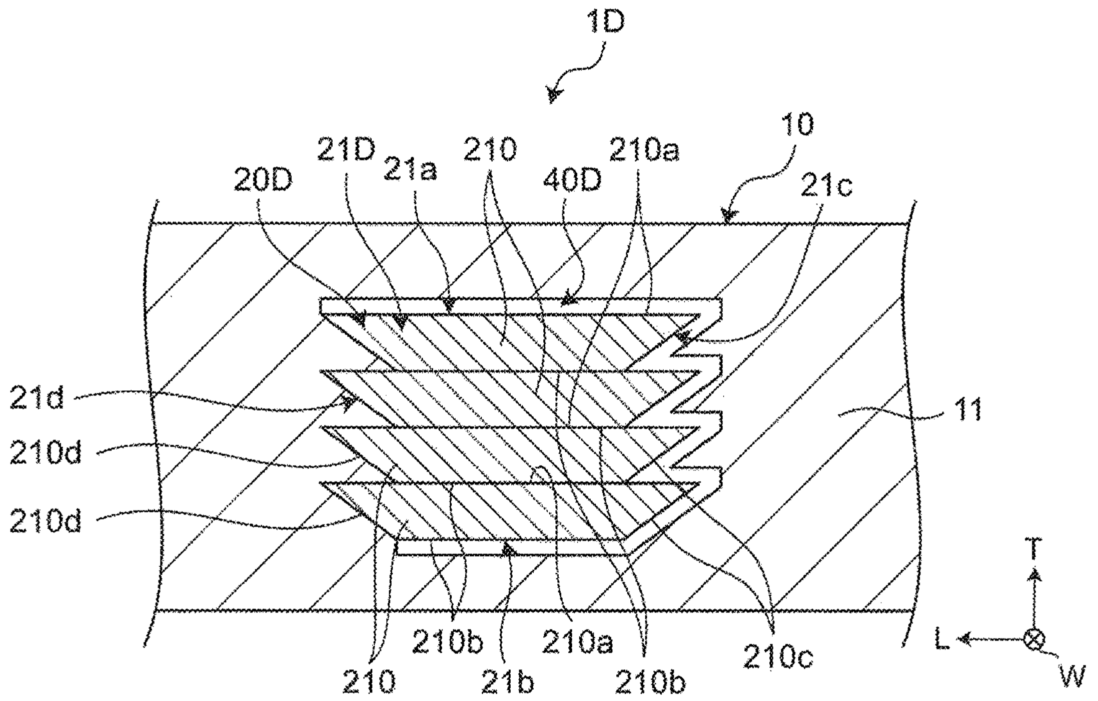
FIG. 10 is a sectional view showing a fifth embodiment of the coil component of the present disclosure.

FIG. 10 is a sectional view showing a fifth embodiment of the coil component of the present disclosure. The fifth embodiment differs from the third embodiment (FIG. 7) in the shape of the coil and the gap. A configuration of the above difference is described below. In the fifth embodiment, the constitutional elements having the same reference numerals as those in the third embodiment have the same configurations as those in the third embodiment, and thus the descriptions thereof are omitted.

As shown in FIG. 10, in a coil component 1D of the fifth embodiment, a piece of first coil wiring 21D of a coil 20D has a plurality of coil conductor layers 210. In the section of the coil conductor layer 210, an upper face 21*a* is longer than a lower face 21*b*, and the sectional shape of the coil conductor layer 210 is an inverted trapezoid. That is, the piece of first coil wiring 21D has a shape in which the piece of first coil wiring 21B of the third embodiment is turned upside down. A gap 40D is continuously formed along the upper face 21*a*, the lower face 21*b*, and an inner side face 21*c* of the piece of first coil wiring 21D. Pieces of second coil wiring, third coil wiring, and fourth coil wiring have the same configuration as the piece of first coil wiring 21D, and the descriptions thereof are omitted.

According to the fifth embodiment, the coil component 1D can be manufactured in an order different from the method of manufacturing the coil component of the third embodiment (FIGS. 8A to 8I). For example, as compared with FIGS. 8A to 8D of the third embodiment, in the fifth embodiment, a second magnetic paste layer 112 is provided on a first magnetic paste layer 111, and then the first layer of coil conductor paste layers 220 is provided. In this way, the coil component 1D can be manufactured by changing the order of the second magnetic paste layer 112 and the coil conductor paste layer 220.

Sixth Embodiment

Figure 11:
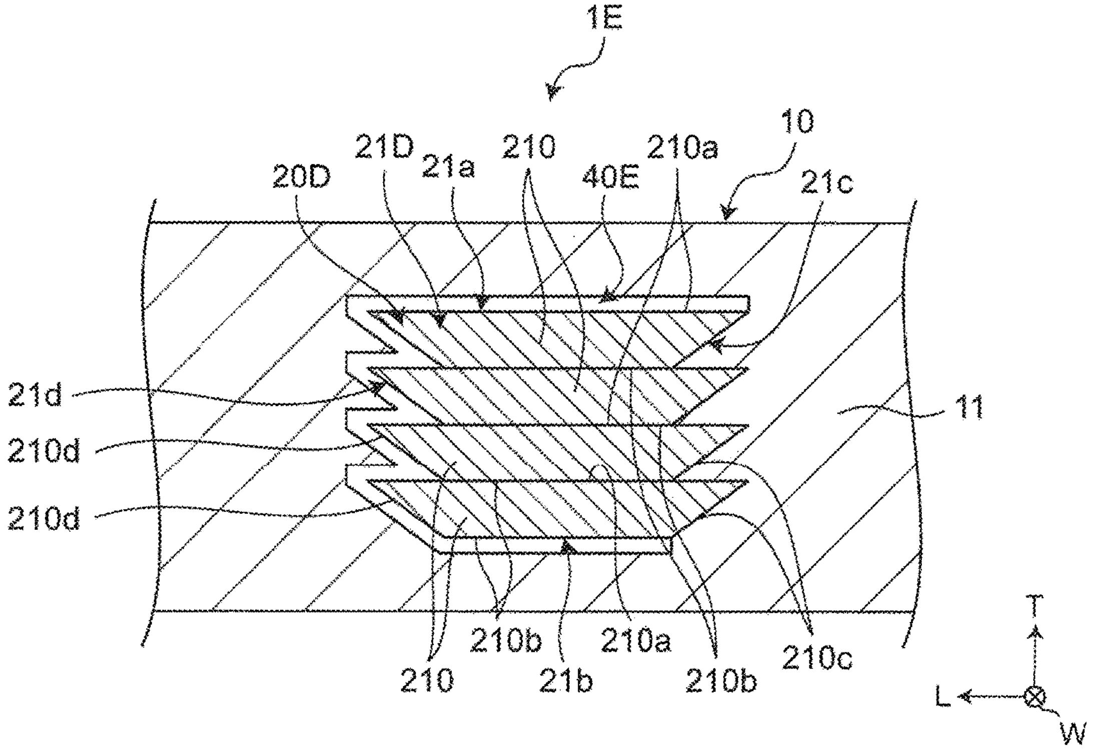
FIG. 11 is a sectional view showing a sixth embodiment of the coil component of the present disclosure.

FIG. 11 is a sectional view showing a sixth embodiment of the coil component of the present disclosure. The sixth embodiment is different from the fifth embodiment (FIG. 10) in the shape of the gap. A configuration of the above difference is described below. In the sixth embodiment, the constitutional elements having the same reference numerals as those in the fifth embodiment have the same configurations as those in the fifth embodiment, and thus the descriptions thereof are omitted.

As shown in FIG. 11, in a coil component 1E of the sixth embodiment, a gap 40E is continuously formed along an upper face 21*a*, a lower face 21*b*, and an outer side face 21*d* of a piece of first coil wiring 21D.

That is, the upper face 21*a*, the lower face 21*b*, and the outer side face 21*d* are provided with the gap 40E with a magnetic layer 11. An inner side face 21*c* comes into contact with the magnetic layer 11. Pieces of second coil wiring, third coil wiring, and fourth coil wiring have the same configuration as the piece of first coil wiring 21D, and the descriptions thereof are omitted.

According to the sixth embodiment, because the side face of the piece of first coil wiring 21D on the gap 40E side is the outer side face 21*d*, the gap 40E is provided between the outer side face 21*d* of the piece of first coil wiring 21D and the magnetic layer 11. As a result, in the case of providing external electrodes 31 and 32 on the surface (the face facing the outer side face 21*d*) of the element body 10, the stray capacitance generated between the external electrodes 31 and 32 and the piece of first coil wiring 21D can be reduced.

Further, because the gap 40E is not provided between the inner side face 21*c* of the piece of first coil wiring 21D and the magnetic layer 11, the sectional area of the portion of the element body 10 that becomes the inner magnetic path of a coil 20D can be increased. The magnetic flux generated from the coil 20D tends to concentrate more in the inner magnetic path of the coil 20D than in the outer magnetic path of the coil 20D, and the impedance acquisition efficiency can be improved by enlarging the inner magnetic path of the coil 20D.

The present disclosure is not limited to the above-described embodiments, and the design can be changed without departing from the gist of the present disclosure. For example, the feature points of the first to sixth embodiments may be combined in various ways. The design can be changed by increasing or decreasing the number of pieces of coil wirings and the number of coil conductor layers.

First Example

Figure 12A:
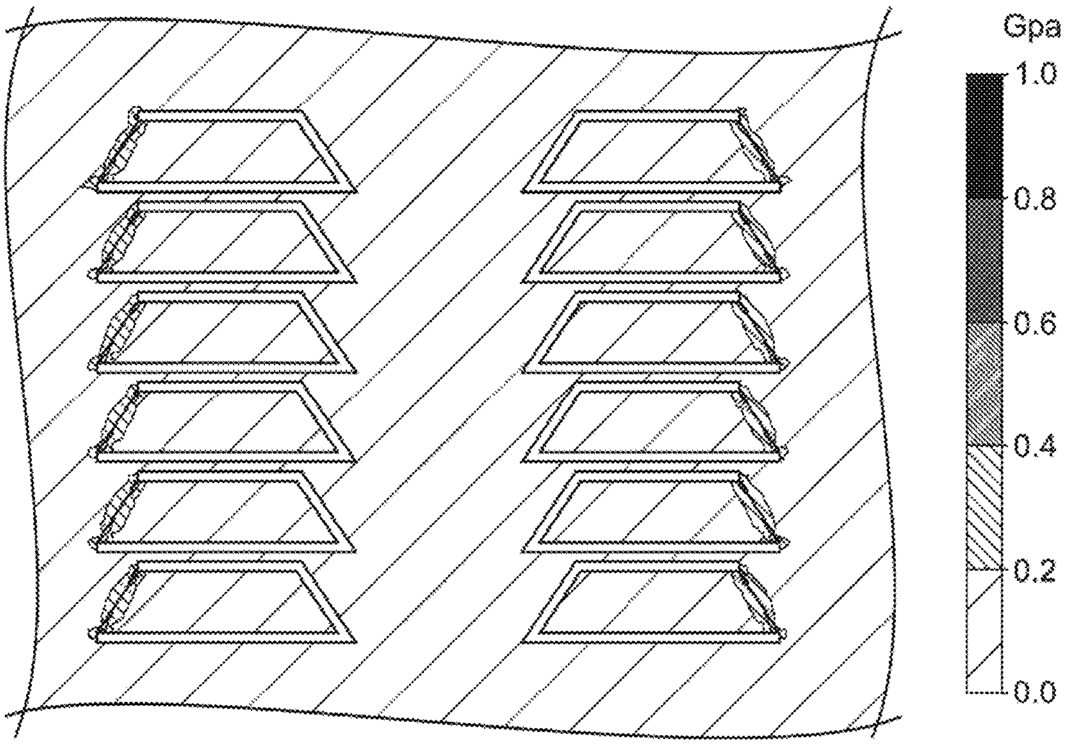
FIG. 12A is a stress distribution diagram of a coil component in which a piece of coil wiring is constituted of one coil conductor layer and an outer side face of the piece of coil wiring is in contact with a magnetic layer.
Figure 12B:
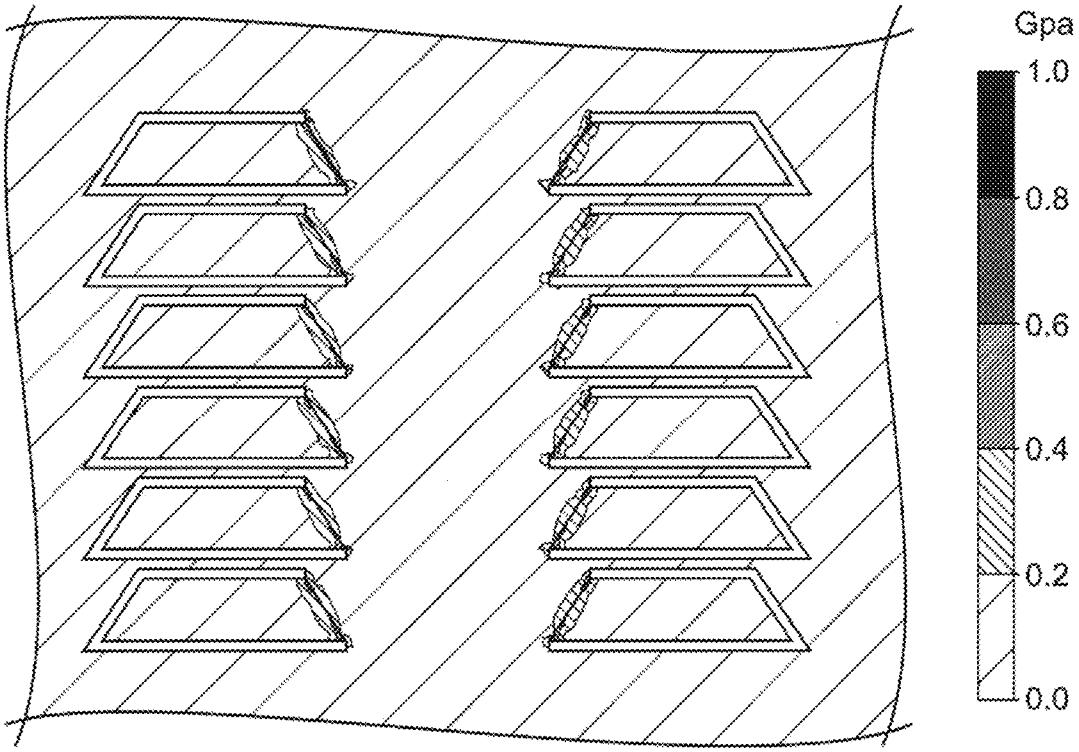
FIG. 12B is a stress distribution diagram of a coil component in which the piece of coil wiring is constituted of one coil conductor layer and an inner side face of the piece of coil wiring is in contact with the magnetic layer.
Figure 12C:
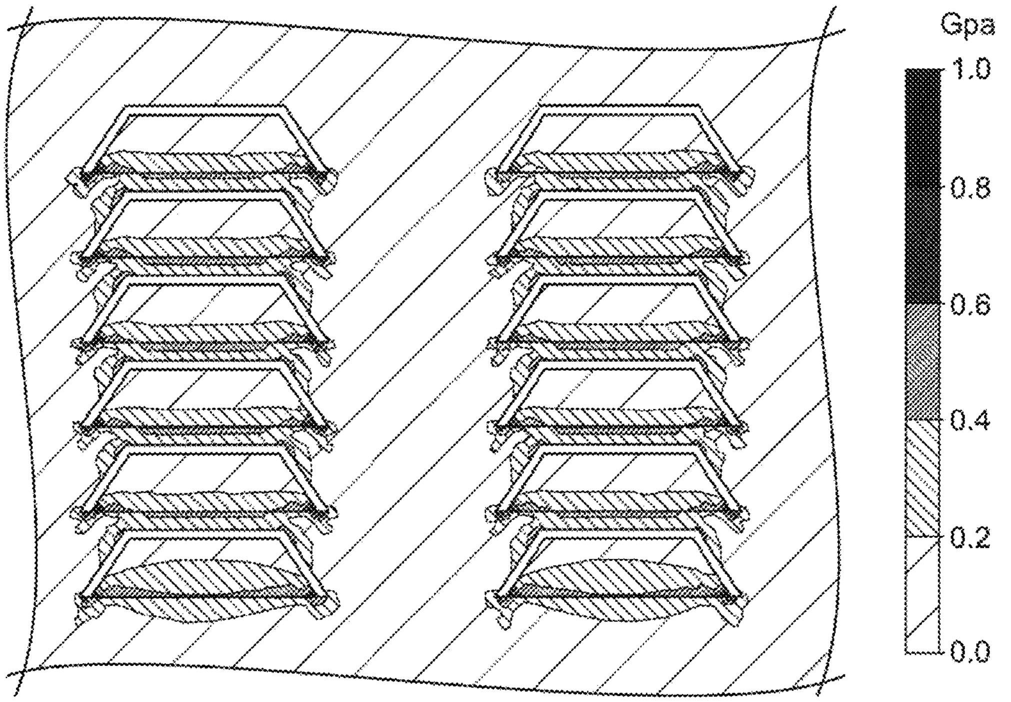
FIG. 12C is a stress distribution diagram of a coil component in which the piece of coil wiring is constituted of one coil conductor layer and a lower face of the piece of coil wiring is in contact with the magnetic layer.

FIGS. 12A to 12C are stress distribution diagrams of coil components in each of which a piece of coil wiring is constituted of one coil conductor layer. FIG. 12A is a stress distribution diagram of the coil component (corresponding to the first embodiment (FIG. 4)) in which an outer side face of the piece of coil wiring is in contact with a magnetic layer. FIG. 12B is a stress distribution diagram of the coil component (corresponding to the second embodiment (FIG. 6)) in which an inner side face of the piece of coil wiring is in contact with the magnetic layer. FIG. 12C is a stress distribution diagram of the coil component (the comparative example) in which a lower face of the piece of coil wiring is in contact with the magnetic layer.

As the measurement conditions of the first example, the W dimension of the coil component is 0.5 mm, and the T dimension of the coil component is 0.5 mm. The interlayer thickness between the upper and lower pieces of coil wiring is 0.015 mm, the inner diameter width of the coil is 0.100 mm, the thickness of the coil conductor layer (the piece of coil wiring) is 0.030 mm, and the maximum width (the width of the lower face) of the coil conductor layer (the piece of coil wiring) is 0.120 mm, the difference between the maximum width and the minimum width of the coil conductor layer (the piece of coil wiring) is 0.020 mm, and the thickness of the gap is 0.005 mm. Under these conditions, the von Mises equivalent stress distribution was obtained.

As shown in FIG. 12A, the stress is generated at the contact portion between the outer side face of the piece of coil wiring and the magnetic layer, but it has been found that the magnitude of the stress is as small as 0.2 to 0.4 GPa, and the stress range is also small. At this time, the strain energy of the element body was 1.03E-6 [J].

As shown in FIG. 12B, the stress is generated at the contact portion between the inner side face of the piece of coil wiring and the magnetic layer, but it has been found that the magnitude of the stress is as small as 0.2 to 0.4 GPa, and the stress range is also small. At this time, the strain energy of the element body was 1.03E-6 [J].

As shown in FIG. 12C, the stress is generated at the contact portion between the lower face of the piece of coil wiring and the magnetic layer, and it has been found that the magnitude of the stress is as large as 0.2 to 1.0 GPa and the range of stress is also large. At this time, the strain energy of the element body was 8.78E-6 [J].

As described above, it has been found that in the case in which the outer side face or inner side face of the piece of coil wiring comes into contact with the magnetic layer, the stress between the piece of coil wiring and the magnetic layer can be relaxed as compared with the case in which the lower face of the piece of coil wiring comes into contact with the magnetic layer.

Second Example

Figure 13A:
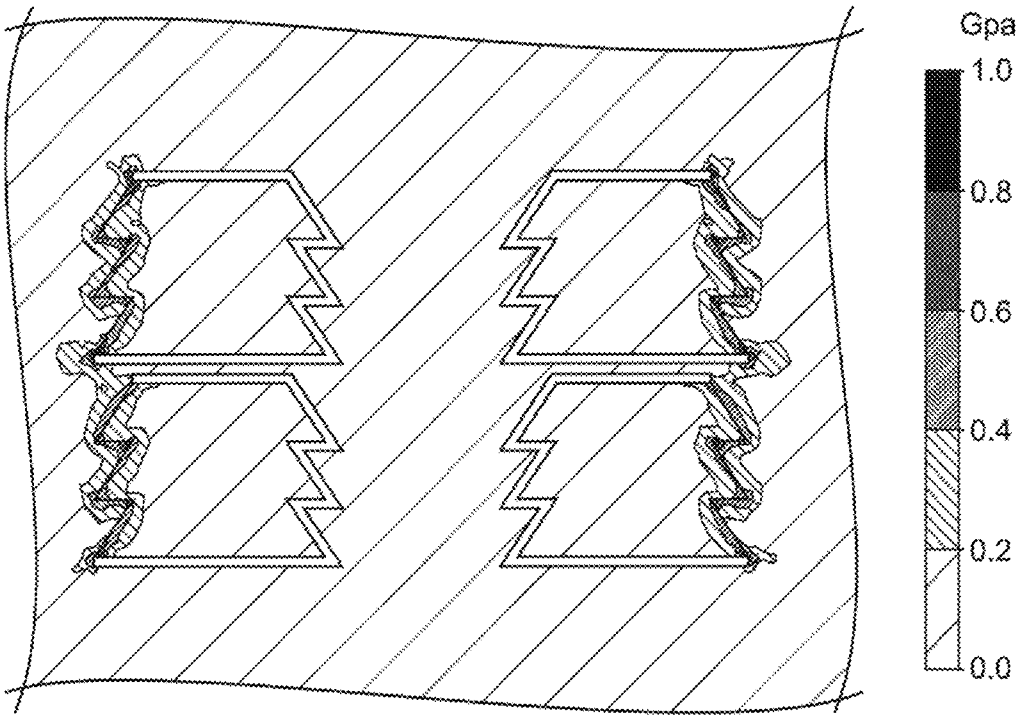
FIG. 13A is a stress distribution diagram of a coil component in which a piece of coil wiring is constituted of three coil conductor layers and an outer side face of the piece of coil wiring is in contact with a magnetic layer.
Figure 13B:
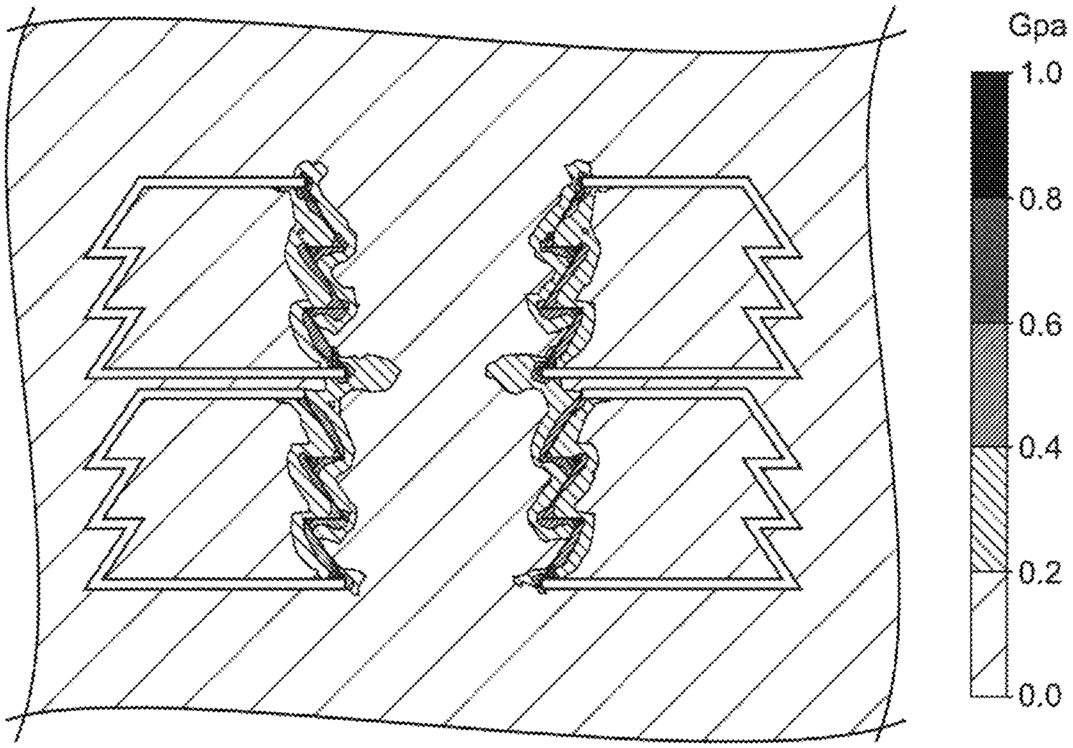
FIG. 13B is a stress distribution diagram of a coil component in which the piece of coil wiring is constituted of three coil conductor layers and an inner side face of the piece of coil wiring is in contact with the magnetic layer.
Figure 13C:
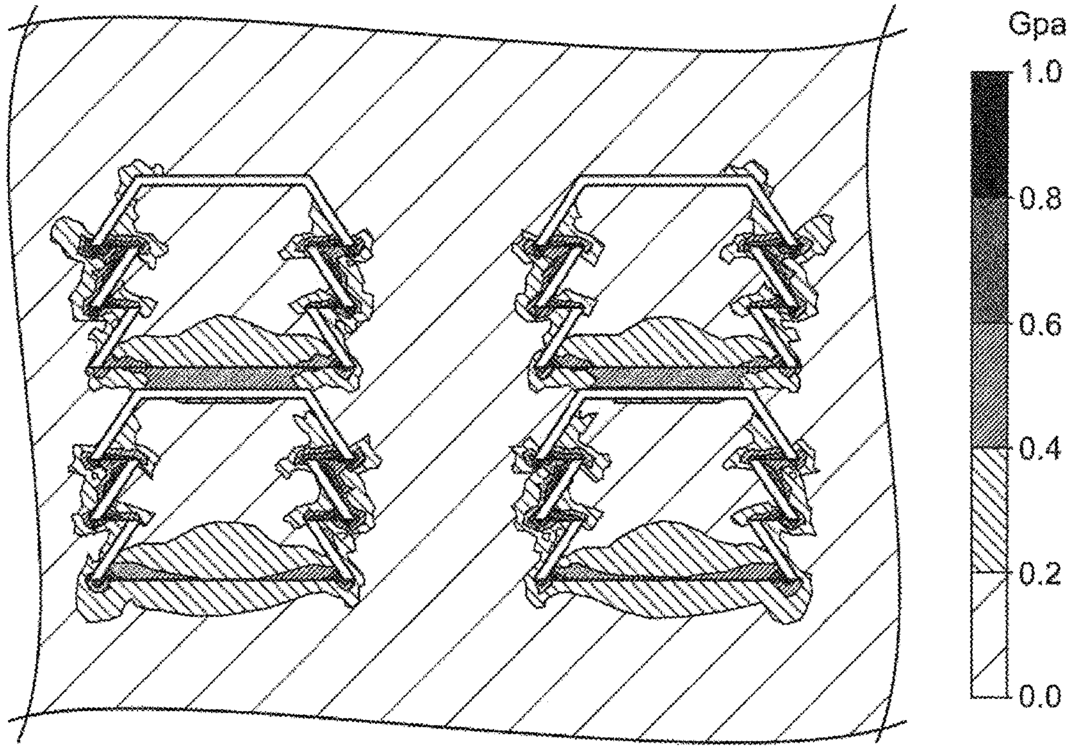
FIG. 13C is a stress distribution diagram of a coil component in which the piece of coil wiring is constituted of three coil conductor layers and a lower face of the piece of coil wiring is in contact with the magnetic layer.

FIGS. 13A to 13C are stress distribution diagrams of coil components in each of which a piece of coil wiring is constituted of three coil conductor layers. FIG. 13A is a stress distribution diagram of the coil component (corresponding to the third embodiment (FIG. 7)) in which an outer side face of the piece of coil wiring is in contact with a magnetic layer. FIG. 13B is a stress distribution diagram of the coil component (corresponding to the fourth embodiment (FIG. 9)) in which an inner side face of the piece of coil wiring is in contact with the magnetic layer. FIG. 13C is a stress distribution diagram of the coil component (the comparative example of the third embodiment) in which a lower face of the piece of coil wiring is in contact with the magnetic layer.

As the measurement conditions of the second example, the W dimension of the coil component is 0.5 mm, and the T dimension of the coil component is 0.5 mm. The interlayer thickness between the upper and lower pieces of coil wiring is 0.015 mm, the inner diameter width of the coil is 0.100 mm, the thickness of one layer of the coil conductor layer is 0.030 mm, and the maximum width (the width of lower face) of one layer of the coil conductor layer is 0.120 mm, the difference between the maximum width and the minimum width of one layer of the coil conductor layer is 0.020 mm, and the thickness of the gap is 0.005 mm. Under these conditions, the von Mises equivalent stress distribution was obtained.

As shown in FIG. 13A, the stress is generated at the contact portion between the outer side face of the piece of coil wiring and the magnetic layer, but it has been found that the magnitude of the stress is mainly as small as 0.2 to 0.4 GPa and the stress range was also small. At this time, the strain energy of the element body was 2.99E-6 [J].

As shown in FIG. 13B, the stress is generated at the contact portion between the inner side face of the piece of coil wiring and the magnetic layer, but it has been found that the magnitude of the stress is mainly as small as 0.2 to 0.4 GPa and the stress range is also small. At this time, the strain energy of the element body was 3.03E-6 [J].

As shown in FIG. 13C, the stress is generated at the contact portion between the lower face of the piece of coil wiring and the magnetic layer, and it has been found that the magnitude of the stress is as large as 0.2 to 1.0 GPa and the range of stress is also large. Further, as shown in FIG. 13C, it has been found that the magnitude of the stress at the contact portion between both ends of the lower face of the one layer of the coil conductor layer and the magnetic layer is mainly as large as 0.6 to 1.0 GPa. At this time, the strain energy of the element body was 9.96E-6 [J].

As described above, it has been found that in the case in which the outer side face or inner side face of the piece of coil wiring comes into contact with the magnetic layer, the stress between the piece of coil wiring and the magnetic layer can be relaxed as compared with the case in which the lower face of the piece of coil wiring comes into contact with the magnetic layer.

What is claimed is:

1. A coil component comprising:
an element body having a plurality of magnetic layers laminated in a first direction; and
a coil provided in the element body, the coil having a plurality of pieces of coil wiring laminated in the first direction,
wherein
the pieces of coil wiring extend along a plane orthogonal to the first direction,
each of the pieces of coil wiring have two faces on both sides in the first direction, and two side faces on both sides in a direction orthogonal to the first direction, in a cross section orthogonal to an extending direction of each of the pieces of coil wiring, and dimensions of the two side faces are less than dimensions of the two faces,
a gap is present among the magnetic layer and the two faces and a one side face of the two side faces of each of the pieces of coil wiring, and
an other side face of the two side faces of each of the pieces of coil wiring is in contact with the magnetic layer.

2. The coil component according to claim 1, wherein
the coil is spirally wound along the first direction, and
the one side face of each of the pieces of coil wiring is a side face of the coil on an inner magnetic path side.

3. The coil component according to claim 2, wherein
the two side faces of each of the pieces of coil wiring includes irregularities.

4. The coil component according to claim 3, wherein
each of the pieces of the coil wiring has an aspect ratio of from 0.3 to less than 1.0 in a cross section orthogonal to the extending direction of each of the pieces of coil wiring.

5. The coil component according to claim 3, wherein
each of the pieces of coil wiring has an aspect ratio of 1.0 or more in a cross section orthogonal to the extending direction of each of the pieces of coil wiring.

6. The coil component according to claim 2, wherein
each of the pieces of the coil wiring has an aspect ratio of from 0.3 to less than 1.0 in a cross section orthogonal to the extending direction of each of the pieces of coil wiring.

7. The coil component according to claim 1, wherein
the coil is spirally wound along the first direction, and
the one side face of each of the pieces of coil wiring is a side face of the coil on an outer magnetic path side.

8. The coil component according to claim 7, wherein
the two side faces of each of the pieces of coil wiring includes irregularities.

9. The coil component according to claim 8, wherein
each of the pieces of the coil wiring has an aspect ratio of from 0.3 to less than 1.0 in a cross section orthogonal to the extending direction of each of the pieces of coil wiring.

10. The coil component according to claim 8, wherein
each of the pieces of coil wiring has an aspect ratio of 1.0 or more in a cross section orthogonal to the extending direction of each of the pieces of coil wiring.

11. The coil component according to claim 7, wherein
each of the pieces of the coil wiring has an aspect ratio of from 0.3 to less than 1.0 in a cross section orthogonal to the extending direction of each of the pieces of coil wiring.

12. The coil component according to claim 1, wherein
the two side faces of each of the pieces of coil wiring includes irregularities.

13. The coil component according to claim 12, wherein
each of the pieces of coil wiring has an aspect ratio of 1.0 or more in a cross section orthogonal to the extending direction of each of the pieces of coil wiring.

14. The coil component according to claim 12, wherein
each of the pieces of the coil wiring has an aspect ratio of from 0.3 to less than 1.0 in a cross section orthogonal to the extending direction of each of the pieces of coil wiring.

15. The coil component according to claim 1, wherein
each of the pieces of the coil wiring has an aspect ratio of from 0.3 to less than 1.0 in a cross section orthogonal to the extending direction of each of the pieces of coil wiring.

* * * * *